(12) United States Patent
Serrada Iranzo et al.

(10) Patent No.: US 10,253,794 B2
(45) Date of Patent: Apr. 9, 2019

(54) DEVICE AND METHOD FOR FASTENING A COMPONENT COMPRISING AT LEAST ONE OPENING ON A CARRIER PART

(75) Inventors: Jose Luis Serrada Iranzo, Braunschweig (DE); Oscar Ribes Marti, Sabadell (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 380 days.

(21) Appl. No.: 13/825,488

(22) PCT Filed: Sep. 27, 2011

(86) PCT No.: PCT/EP2011/004825
§ 371 (c)(1),
(2), (4) Date: Mar. 21, 2013

(87) PCT Pub. No.: WO2012/048801
PCT Pub. Date: Apr. 19, 2012

(65) Prior Publication Data
US 2013/0180097 A1     Jul. 18, 2013

(30) Foreign Application Priority Data

Oct. 15, 2010   (DE) .................. 10 2010 048 956

(51) Int. Cl.
*F16B 5/08*     (2006.01)
*F16B 5/02*     (2006.01)
(Continued)

(52) U.S. Cl.
CPC .............. *F16B 5/08* (2013.01); *F16B 5/0233* (2013.01); *F16B 5/065* (2013.01); *F16B 5/0628* (2013.01);
(Continued)

(58) Field of Classification Search
CPC ........ F16B 5/06; F16B 5/0607; F16B 5/0621; F16B 5/065; F16B 5/0664; F16B 5/08;
(Continued)

(56) References Cited

U.S. PATENT DOCUMENTS 1,329,524 A * 2/1920 Hill .......................... 12/147 R
1,562,615 A * 11/1925 Brochu ........................ 29/235
(Continued)

FOREIGN PATENT DOCUMENTS

CN        1096558 A     12/1994
CN        2577026 Y     10/2003
(Continued)

OTHER PUBLICATIONS

International Search Report corresponding to PCT/EP2011/004825, dated Feb. 13, 2012.

*Primary Examiner* — Christopher M Koehler
(74) *Attorney, Agent, or Firm* — Pilloff & Passino LLP; Martin J. Cosenza

(57) ABSTRACT

Device for fastening a component comprising at least one opening on a carrier part characterized by at least one fastening element projecting from the carrier part and welded to the carrier part, on which fastening element the component can be fastened, by mounting the component with its at least one opening onto the at least one fastening element, wherein the at least one fastening element comprises at least one elastic locking element, which locks on the component opening when the component is mounted on the fastening element.

46 Claims, 3 Drawing Sheets

(51) Int. Cl.
*F16B 5/06* (2006.01)
*F16B 21/08* (2006.01)

(52) U.S. Cl.
CPC ....... *F16B 21/088* (2013.01); *Y10T 29/49947* (2015.01); *Y10T 403/471* (2015.01)

(58) Field of Classification Search
CPC ........ F16B 21/06; F16B 21/08; F16B 21/086; F16B 21/088; Y10T 29/536; Y10T 29/53657; Y10T 29/53783; Y10T 29/53952
USPC ... 52/718.01, 718.04, 718.06, 718.03, 716.5, 52/716.6
See application file for complete search history.

(56) References Cited

U.S. PATENT DOCUMENTS

| | | | | |
|---|---|---|---|---|
| 1,892,989 A | * | 1/1933 | Koza | 29/222 |
| 2,267,379 A | * | 12/1941 | Tinnerman | F16B 5/125 411/516 |
| 2,572,215 A | * | 10/1951 | Swart | 403/228 |
| 2,657,818 A | * | 11/1953 | Mueller | 29/235 |
| 2,696,443 A | * | 12/1954 | Allbright | 426/513 |
| 2,697,870 A | * | 12/1954 | Zucker | 29/222 |
| 2,901,310 A | * | 8/1959 | Mott | 29/235 |
| 3,073,016 A | * | 1/1963 | Drake | 29/235 |
| 3,289,286 A | * | 12/1966 | Belanger | 29/235 |
| 3,320,712 A | * | 5/1967 | Rapata | 52/511 |
| 3,387,352 A | * | 6/1968 | Walter | 29/235 |
| 3,473,283 A | * | 10/1969 | Meyer | 52/718.05 |
| 3,680,272 A | * | 8/1972 | Meyer | 24/295 |
| 3,746,378 A | * | 7/1973 | Meyer | F16B 5/04 411/34 |
| 3,842,483 A | * | 10/1974 | Cramer | 29/450 |
| 3,850,777 A | * | 11/1974 | Mare et al. | 156/494 |
| 3,866,299 A | * | 2/1975 | Gregg et al. | 29/235 |
| 4,297,769 A | * | 11/1981 | Coules | 174/138 D |
| 4,778,320 A | * | 10/1988 | Nakama | 411/509 |
| 4,810,145 A | * | 3/1989 | Villas | F16B 21/086 29/401.1 |
| 5,758,411 A | * | 6/1998 | Hahn | 29/842 |
| 5,795,118 A | * | 8/1998 | Osada et al. | 411/171 |
| 5,937,498 A | * | 8/1999 | Ploeger et al. | 29/426.6 |
| 6,205,625 B1 | * | 3/2001 | Kato | F16B 5/0642 24/297 |
| 7,036,203 B2 | | 5/2006 | Rudduck | |
| 2005/0217088 A1 | | 10/2005 | Lin | |
| 2011/0014005 A1 | * | 1/2011 | Shinozaki | 411/347 |

FOREIGN PATENT DOCUMENTS

| | | |
|---|---|---|
| CN | 1501872 A | 6/2004 |
| CN | 2937594 Y | 8/2007 |
| WO | 94/19561 A1 | 9/1994 |

* cited by examiner

DEVICE AND METHOD FOR FASTENING A COMPONENT COMPRISING AT LEAST ONE OPENING ON A CARRIER PART

CROSS-REFERENCE TO RELATED APPLICATIONS

The present application is a National Phase of International Application Number PCT/EP2011/004825, filed Sep. 27, 2011, and claims priority from German Application Number 102010048956.5, filed Oct. 15, 2010.

BACKGROUND

The invention relates to a device for fastening a component comprising at least one opening on a carrier part. The invention also relates to a method for fastening a component on a carrier part. For example, in the automobile industry, flat components such as heat shield plates or the like often need to be fastened on carrier parts, for example body parts. For this, the components generally have a plurality of openings corresponding with corresponding fastening points on the body. Fastening bolts with an external thread are normally welded on the body at the provided fastening points. The component is mounted with its openings onto the fastening bolts assigned to these openings. Another fastening part, for example a fastening clip, is subsequently mounted from outside on the fastening bolts reaching through the component openings. The component to be fastened on the body is thus held between the body and the fastening clip on the fastening bolt.

The known fastening of such components achieves in operation high holding forces and thus great operating safety. However, the installation of the components is comparatively complicated and thus expensive.

SUMMARY OF THE INVENTION

Starting from the explained state of the art, the object of the invention is to provide a device and a method of the initially named type, with which an easier and thus less expensive installation compared to the state of the art is achieved at high operating safety.

On the one hand, the invention solves the object through a device for fastening a component comprising at least one opening on a carrier part, comprising at least one fastening element welded to the carrier part and projecting from it, on which the component is fastenable in that the component with its at least one opening is mountable on the at least one fastening element, wherein the at least one fastening element has at least one elastic locking element, which locks on the component opening when the component is mounted on the fastening element.

The carrier part can be for example a body part, in particular a body sheet, of an automobile. The carrier part consists of a metal material. The at least one fastening element can also consist of a metal material. For example, the fastening part can be a one-piece stamped and bent part made of metal. The component can be for example a flat add-on part made of metal or plastic. Examples include heat shield plates, door coverings, etc. According to the invention, the fastening element is fixedly, connected with the carrier part, for example in a form-fitting manner, and has at least one elastic locking element, on which the component locks. According to the invention, a fastening clip welded to the carrier part, i.e. connected in a form-fitting manner with the carrier part, is provided. Particularly high holding forces are hereby achieved. A plurality of such fastening clips can be provided on the carrier part. The mounting and fastening of the component on the carrier part then takes place in a simple manner through locking of the component opening(s) or respectively the fastening elements. Accordingly, a fastening bolt with external thread such as with the state of the art is not required. Moreover, in contrast to the state of the art, no other fastening clip is required, which is mounted on the component mounted on the fastening bolt. Rather, the fastening of the component is realized exclusively via the locking on the fastening element arranged on the carrier part. Compared to the state of the art, fewer parts are thus required for installation. The production of the device according to the invention is thereby easier and less expensive and the installation of the component on the carrier part is realized in an easier and less expensive manner. The carrier part and if applicable also the component to be fastened on it can thereby be part of the device according to the invention.

According to one embodiment, the fastening element can comprise at least two resilient locking legs which project away from the carrier part. The fastening element can be connected fixedly with the carrier part, for example with a foot or appendage. The elastic locking legs can then extend from this foot or appendage. In this manner, the locking on the component opening is achieved in a particularly simple manner. For simplification of the mounting of the component with its opening on the fastening element, the cross-section of the fastening element can be reduced in a direction away from the carrier part. In particular, the cross-section of the locking legs can decrease in their idle position in a direction away from the carrier part. The locking legs can then be pushed inward when mounting the component so that they get through the opening of the component and lock behind the opening.

According to another particularly practical embodiment, the locking legs can each have at least one locking projection, wherein the locking projections each comprise a locking surface facing towards the carrier part, wherein the locking surfaces abut on an abutting surface of the component in the fastened state of the component.

According to a further embodiment the fastening element may comprise a welding surface with which it is welded to the carrier part, wherein the welding surface comprises a welding dome which is welded to the carrier part. Conventionally components to be welded to a carrier part may comprise for example a sharp tip with which they are welded to the carrier part. Providing a dome, for example a hemispherical dome, to be welded to the carrier part leads to a maximised contact surface between the fastening element and the carrier part and thus to a stronger welding connection and greater holding forces.

The invention also solves the object through a method for fastening a component on a carrier part with a device according to the invention in accordance with a first aspect, characterized by the steps:

a bushing is inserted into the opening of the component,
the bushing is mounted on the fastening element, wherein the at least one locking element of the fastening element is pushed towards the inside,
the component is pushed past the at least one locking element of the fastening element with its opening and the bushing is pulled off the fastening element and removed from the component opening wherein the at least one locking element of the fastening element moves back to its idle position and locks on the component opening.

The invention also solves the initially named object through a method for fastening a component on a carrier part with a device according to the invention in accordance with a first aspect, characterized by the steps:

- a bushing is for example inserted from a first side into the opening of the component, wherein a pushing element is mounted for example also on the first side onto the bushing and wherein the pushing element abuts on the component with an abutting surface,
- the bushing is mounted on the fastening element, wherein the at least one locking element of the fastening element is pushed towards the inside, the pushing element is pushed over the bushing in the direction of the carrier part, wherein the component is pushed past the at least one locking element of the fastening element with its opening,
- the bushing is pulled off the fastening element, wherein the at least one locking element of the fastening element moves back to its idle position,
- the pushing element is pulled off the component, so that the at least one locking element of the fastening element locks on the component opening.

In the case of the method according the first and second aspect, a bushing is inserted into the corresponding component opening so that it projects over the component in the direction of the corresponding fastening point on the carrier part. The bushing serves to give the often thin and thus not very dimensionally stable component the stability required for installation on the carrier part. Installation requires in particular the application of a not insignificant pressure to the component. Through the provision of a bushing or respectively such a cage in the component opening, installation is enabled in a simple manner also in the case of thin components.

In the case of the method according to the invention according to the second aspect, a bushing and an associated pushing element are used to install the component on the carrier part. Before the actual installation, the bushing is in turn stuck through the corresponding component opening so that it projects over the component in the direction of the corresponding fastening point on the carrier part. In this method a pushing element that abuts on the surface of the component with a suitable abutting surface is located at the opposite side of the component. In this manner, the component can be held and positioned above the pushing element in a simple manner for installation, for example manually or by means of a suitable tool. The bushing is subsequently mounted on the associated fastening element, wherein the bushing as in the method according to the first aspect pushes the preferably provided locking legs of the fastening element inward and holds it in the compressed position. The mounting of the bushing can also be realized via the pushing element, for example manually or by means of a suitable tool. In this compressed state of the locking element(s) of the fastening element, the cross-section of the fastening element as in the method according to the first aspect is sufficiently low so that the component with its associated component opening can be pushed over the fastening element and in particular past the locking element(s). This is realized in accordance with the method according to the invention according to the second aspect by means of a relative movement between the pushing element and the bushing. In particular, the pushing element is pushed over the bushing in the direction of the carrier part. Due to the abutting of the pushing element on the surface of the component, the component is thereby also pushed in the direction of the carrier part and in particular past the locking element(s) of the fastening element. If the locking elements of the fastening element now move back to their idle position, the component is caught between the carrier part and the locking element(s). This return movement to the idle position occurs in the case of both methods according to the invention when the bushing is pulled off the fastening element. In the case of the method according to the second aspect, the bushing is displaced relative to the pushing element away from the carrier part. The locking element(s) thereby move back to their idle position so that the component can no longer be pulled down from the fastening element. The pushing element still in contact with the component surface is subsequently pulled off downwardly so that the component is located in the final installed position. The pushing element can thereby be held in a suitable manner on the component, for example by means of a tool or the like, and, if applicable, also on the carrier part, after the bushing was already pulled from the fastening element. In this manner, an undesired release of the component is prevented during installation. For example, electric or hydraulic devices can be used to hold the pushing element.

With both methods according to the invention, a particularly simple and mainly automated installation of the component on the carrier part is possible whether it be manually or by means of suitable tools. The bushing used in the case of the method according to the invention and, if applicable, the pushing element used in the case of the method according to the invention can naturally also be part of the device according to the invention for fastening the component on the carrier part.

The bushing and the pushing element can be separate components. It is also possible that the bushing and the pushing element form an integrated component. The bushing and the pushing element are moveable relative to each other, preferably displaceably. It can thereby be prevented, for example through suitable stops that the bushing and the pushing element can completely release from each other. The installation of the component and also the reuse of the bushing and the pushing element can thereby be simplified. But it is also possible that the bushing and the pushing element completely release from each other and only come in contact with each other for installation of the component, but are otherwise completely separate components.

According to another embodiment, the bushing can be cylindrical, wherein the outer diameter of the bushing is at least slightly smaller than the diameter of the component opening. If the outer diameter of the bushing is only slightly smaller than the component opening, the bushing can abut on the inside of the component opening after being inserted through the component opening. An unintentional release of the bushing from the component opening during installation can thus be prevented. In a corresponding manner, the pushing element can have a cylindrical recess for receiving the bushing, wherein the diameter of the cylindrical recess is at least slightly larger than the outer diameter of the bushing. The pushing element can be hollow cylindrical.

According to another embodiment, the bushing can be hollow cylindrical, wherein the inner diameter is smaller than the maximum cross-section of the fastening element with its at least one locking element. The reduction of the cross-section of the fastening element during mounting of the bushing is hereby achieved.

BRIEF DESCRIPTION OF THE DRAWINGS

Exemplary embodiments of the invention are explained in greater detail below using figures. The drawings show schematically in.

DETAILED DESCRIPTION

Figure 1:
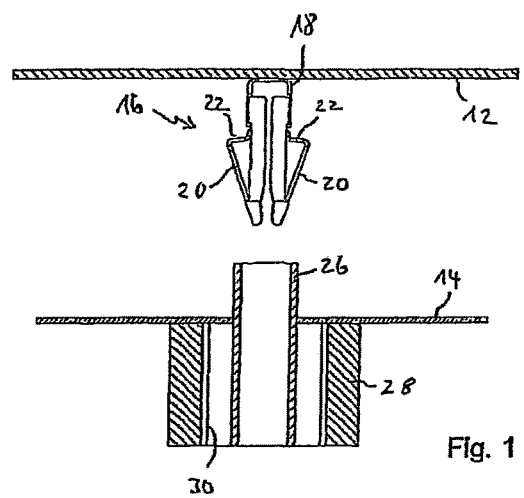
FIG. 1 a device according to the invention in a first installation state in a cross-sectional view, FIG. 2 the device from FIG. 1 in a second installation state in a cross-sectional view, FIG. 3 the device from FIG. 1 in a third installation state in a cross-sectional view, FIG. 4 the device from FIG. 1 in a fourth installation state in a cross-sectional view, FIG. 5 the device from FIG. 1 in a fifth installation state in a cross-sectional view, FIG. 6 a device according to the invention according to another exemplary embodiment in a cross-sectional view, FIG. 7 a fastening element according to a further embodiment of the invention in a perspective view, FIG. 8 the fastening element of FIG. 7 in a first side view, and FIG. 9 the fastening element of FIG. 7 in a second side view

If not otherwise specified, the same reference numbers indicate the same objects in the figures. In the shown example, a flat carrier part 12 made of metal is provided, which can concern, for example, a body part of an automobile. A flat component 14 should be fastened here on the carrier part 12, which can concern, for example, a heat shield plate made of metal or plastic. For this, a fastening element 16 is fixedly connected with the carrier part 12. The fastening element 16 here is a one-piece stamped and bent part made of metal material. It has a foot section 18, which is welded to the carrier part 12. Starting from the foot part 18, two elastic locking legs 20 extend in the shown example away from the carrier part 12, downward in the figures. For example, in FIG. 1, the locking legs 20 are shown in their idle position. It can be seen that the cross-section of the fastening element 16 and in particular of its locking legs 20 decreases from a locking surface 22 forming the upper end of the locking projection of the locking legs 20 towards the free end of the locking legs 20.

For the installation of the component 14 on the carrier part 12, the component 14 has an opening 24 associated with the fastening element 16. The diameter of the opening 24 is somewhat larger than the cross-section of the foot 18 of the fastening element 16, however smaller than the maximum cross-section of the fastening element 16 in the area of the locking surfaces 22 of the locking legs 20.

According to the invention, in addition a bushing 26 and a pushing element 28 are used for the fastening of the component 14 on the carrier part 12. In the example shown, the bushing 26 and the pushing element 28 are designed hollow cylindrically. Thereby the outer diameter of the bushing 26 is slightly smaller than the diameter of the component opening 14. The bushing 26, as shown in the installation state in FIG. 1, can thereby be stuck through the component opening 24 of the component 14. Both the outer diameter as well as the inner diameter of the hollow cylindrical bushing 26 stuck through the component opening 24 are thereby smaller than the maximum cross-section of the fastening element 16 in the area of its locking surfaces 22. Moreover, a cylindrical receiver 30 of the pushing element 28 is greater in diameter than the outer diameter of the bushing 26 so that the bushing 26 is displaceable in the axial direction within the cylindrical receiver 30 of the pushing element 28.

Figure 2:
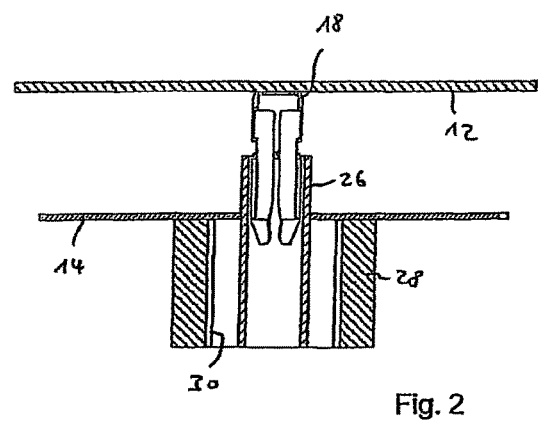
Figure 3:
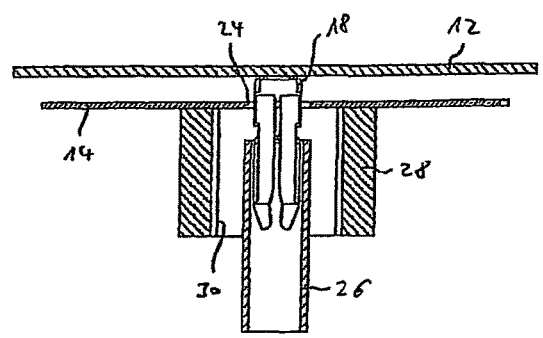
Figure 4:
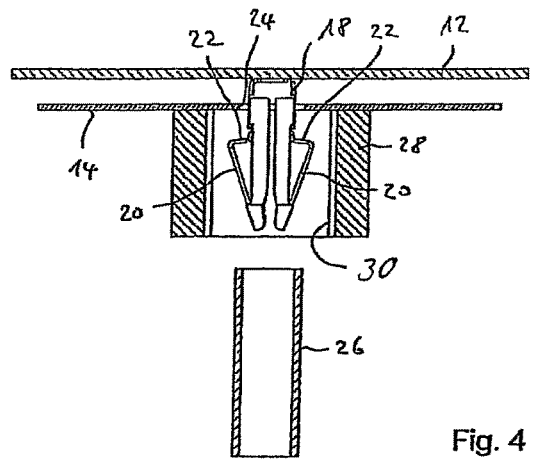
Figure 5:
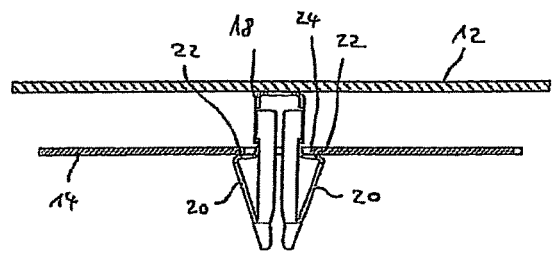

Based on the FIGS. 1 through 5, the installation of the component 14 on the carrier part 12 should now be explained. FIG. 1 shows the initial state for the installation of the component 14 on the carrier part 12. In this state, the bushing is pushed partially through the component opening 24 of the component 14 so that the bushing 26 in FIG. 1 protrudes upwards from the component 14. The bushing 26 is also located within the cylindrical opening 30 of the pushing element 28. The pushing element 28 abuts on the bottom side of the component 14 with its top side. In this state, the component 14 is thus supported by the pushing element 28. The next installation step is shown in FIG. 2. The component 14 with bushing 26 and pushing element 28 is thereby moved upward in the figures, wherein the bushing 26 is pushed onto the fastening element 16 and in particular its locking legs 20. The elastic locking legs 20 are thereby pushed out of the idle position inward, as can be seen in the cross-sectional view in FIG. 2. In the next installation step, as shown in FIG. 3, the pushing element 28 including the component 14 is pushed upward along the bushing 26 until the component 14 is located above the locking surfaces 22 of the fastening element 16. The bushing 26 is subsequently pulled downward away from the fastening element 16, as shown in FIG. 4, wherein the locking legs 20 move back outward into their idle position. In the shown example, the bushing 26 is pulled completely out of the pushing element 28. The pushing element 28 is held in its position, for example by means of a suitable hydraulic or electric tool or also manually. As shown in FIG. 5, the pushing element 28 is subsequently also removed from the fastening element 16 downward. The component 14 thereby also moves downward until the edge of its opening 24 abuts against the locking surfaces 22 of the fastening element 16. In this final installed state shown in FIG. 5, the component 14 is securely held between the carrier part 12 and the locking legs 20, in particular the locking surfaces 22.

Figure 6:
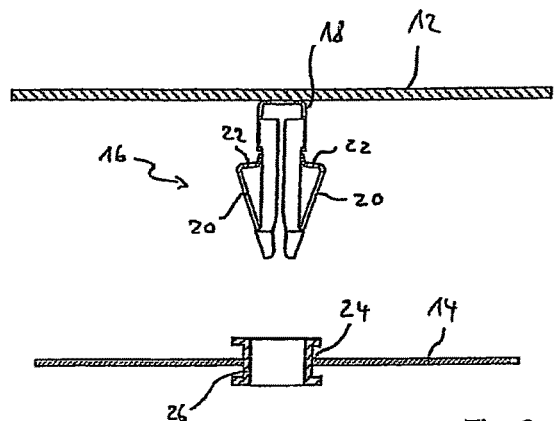

FIG. 6 shows a device according to the invention in accordance with another exemplary embodiment. In the case of this device, only one cage-like bushing 26 inserted into the component opening 24 is provided, but no pushing element. For installation, the component 14 with the bushing 26 is pushed onto the fastening element 16, wherein the locking legs 20 are in turn deformed elastically inward. In this manner, the component 14 with its opening 24 can be pushed past the locking legs 20. The bushing 26 can then be removed from the component opening 24 and pulled off from the fastening element 16, wherein the locking legs 20 move back into their initial position and lock on the component opening 24.

Figure 7:
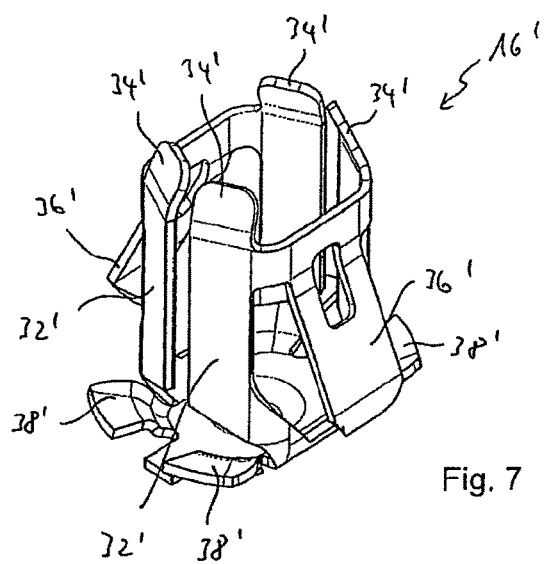
Figure 8:
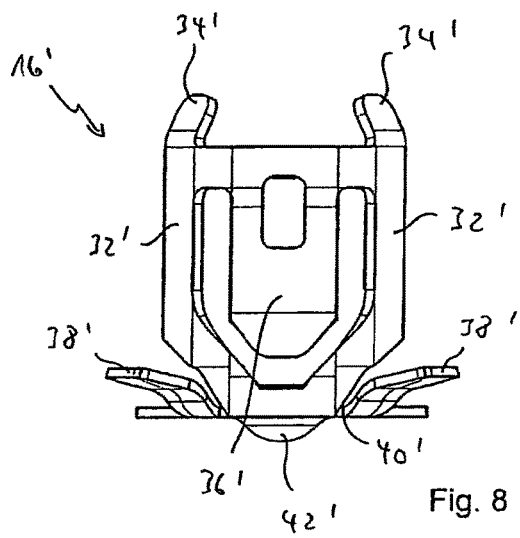
Figure 9:
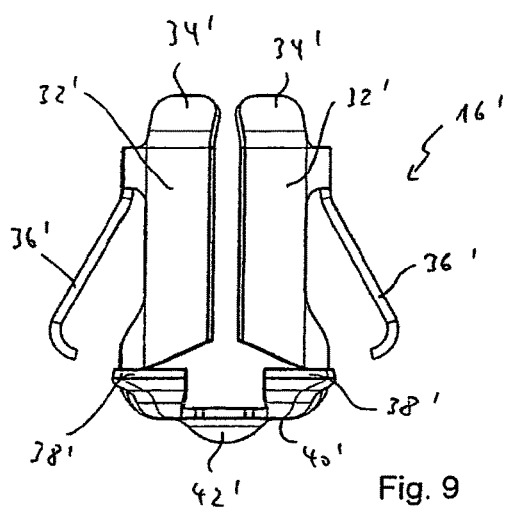

In FIGS. 7 to 9 a fastening element 16' of a further embodiment of the invention is shown. This fastening element 16' is also a one-piece stamped and bent part made of metal material. It also has a foot section 18' from which two leg portions 32' are extending. On their end portions facing away from the foot section 18' each of the leg portions 32' comprises two elastic insertion tongues 34' wherein the elastic insertion tongues 34' together form a tapered insertion area with which the fastening element 16' is inserted into the opening 24 of the component 14. Each of the leg potions 32' further comprises an elastic locking arm 36' extending from the respective leg portion 32' in the direction of the foot section 18'. As can be seen for example in FIG. 9 the locking arms 36' extend towards the outside of the fastening element 16'. When the fastening element 16' is pushed into the opening 24 of the component 14 the locking arms 36' are first pushed together and subsequently lock on the opening 24. The foot section 18' has four corresponding elastic locking projections 38' so that the component 14 is held between the locking arms 36' and the locking projections 38'. The foot section 18' further comprises a welding surface 40', with which it is welded to the carrier part 12 which is not shown in FIGS. 7 to 9. The welding surface 40' comprises a welding dome 42' which has a generally hemi-spherical form extending from the welding surface 40'. The fastening element 16' is welded to the carrier part 12 with this welding dome 42'. The welding dome 42' increases the contact surface upon welding and thus leads to a stronger weld connection and therefore greater holding forces of the device.

The invention claimed is:

1. A device for fastening a component to a carrier part, wherein the component has at least one opening, the device comprising:
   at least one fastening element projecting from the carrier part and welded to the carrier part, wherein the device is configured such that the component is fastenable on the fastening element by mounting the component with the at least one opening onto the at least one fastening element,
   the at least one fastening element comprising at least one elastic locking element, wherein the at least one locking element is configured to lock on the at least one opening of the component and remains undeformed when the component is mounted on the fastening element,
   the at least one fastening element is a one-piece stamped and bent part made of metal material.

2. Device according to claim 1, wherein the at least one locking element comprises at least two resilient locking legs which project away from the carrier part.

3. Device according to claim 2, wherein the cross section of the fastening element decreases at least in sections in a direction away from the carrier part.

4. Device according to claim 2, wherein the cross section of the locking legs decreases at least in sections in a direction away from the carrier part in their idle position, wherein the locking legs are pushed towards the inside of the at least one opening of the component upon mounting of the component so that the locking legs reach through the opening of the component.

5. Device according to claim 2, wherein the locking legs each comprise at least one locking projection, wherein the locking projections each comprise a locking surface facing towards the carrier part, wherein the locking surfaces abut on an abutting surface of the component in the fastened state of the component.

6. Device according to claim 1, wherein the fastening element comprises a welding surface with which it is welded to the carrier part, wherein the welding surface comprises a welding dome which is welded to the carrier part.

7. Method for fastening a component on a carrier part with a device according to claim 1, wherein:
   a bushing is inserted into the opening of the component,
   the bushing is mounted on the fastening element wherein the at least one locking element of the fastening element is pushed towards the inside of the opening of the component,
   the at least one opening of the component is pushed past the at least one locking element of the fastening element, and the bushing is pulled off the fastening element and removed from the at least one opening of the component, wherein the at least one locking element of the fastening element moves back to its idle position and locks on the at least one opening of the component.

8. Device according to claim 1, wherein:
   the at least one fastening element is configured such that the at least one fastening element moves together with the carrier part during fastening of the component to the carrier part in a direction of insertion of the fastening element into the component.

9. Device according to claim 1, wherein the at least one locking element includes two legs that extend downward from a tip thereof at an angle of about 25 degrees from the longitudinal axis of the fastening element.

10. Device according to claim 1, wherein the at least one locking element includes a plurality of locking legs extending outwardly with respective locking surfaces that extend inward away from respective outermost extensions of the locking legs.

11. Device according to claim 1, wherein the at least one locking element includes a cross-sectional outer profile in the shape of an arrowhead.

12. Device according to claim 1, wherein the at least one locking element has only two locking legs.

13. Device according to claim 1, wherein the at least one locking element has a plurality of locking legs, wherein the locking legs extend over half the length of the fastening element with respect to the longitudinal direction of the fastening element.

14. Device according to claim 1, wherein the at least one locking element has a plurality of locking legs, wherein the locking legs collectively extend away from a longitudinal axis of the at least one fastening element to a diameter about twice that of the portion of the fastening element welded to the carrier part.

15. Device according to claim 1, wherein the at least one locking element has a longitudinal height greater than a maximum outer diameter lying on a plane normal to the longitudinal direction of the at least one fastening element.

16. Device according to claim 1, wherein:
   the at least one locking element is taller than it is wide, and
   the at least one locking element comprises at least two resilient locking legs each of which has
     a first portion that projects away from the carrier part,
     a second portion that extends from the first portion towards the carrier part outwardly away from a longitudinal axis of the fastening element, and
     a third portion defining an end of the locking leg and extending from the second portion toward the longitudinal axis of the fastening element.

17. Device according to claim 1, wherein
   the at least one fastening element has a foot part, and
   starting from the foot part, two elastic locking legs of the elastic locking element extend away from the carrier part, wherein a cross-section of the locking legs decreases from a locking surface forming an upper end of a locking projection of the locking legs towards a free end of the locking legs thereby forming an arrow shape.

18. Device according to claim 1, wherein the at least one fastening element is about twice as tall as it is wide when the at least one elastic locking element is in an unrestrained state.

19. Device according to claim 1, wherein the at least one locking element is configured to resiliently deform inward such that a maximum outer diameter of a thickness of the at least one locking element is reduced by at least about half.

20. Device according to claim 1, wherein the at least one locking element is configured to resiliently deform inward such that a maximum outer diameter thereof is reduced by about one fifth of the height of the at least one fastening element.

21. Device according to claim 1, wherein the at least one locking element comprises at least two resilient locking legs which project away from the carrier part and then extend towards the carrier part outwardly away from a longitudinal axis of the fastening element, and then extend inwardly towards the longitudinal axis of the fastening element.

22. Device according to claim 1, wherein the at least one locking element is configured to resiliently deform inward such that substantially all of the least one locking element is within an outer boundary of a base of the at least one fastening element.

23. Device according to claim 1, further comprising the component with at least one opening,
wherein when the at least one elastic locking element locks on the at least one opening of the component, an end of the at least one elastic locking element is configured to be inward of and spaced away from a periphery of the at least one opening of the component in a direction perpendicular to a longitudinal axis of the fastening element.

24. A device for fastening a component including at least one opening, the device comprising:
a carrier part;
at least one fastening element projecting from the carrier part and welded to the carrier part,
wherein
the device is configured such that the component is fastenable, by mounting the component with the at least one opening onto the at least one fastening element,
the at least one fastening element comprises at least one elastic locking element, which is configured to lock on the at least one opening of the component and remains undeformed when the component is mounted on the fastening element, and
the at least one fastening element consists of a metal material.

25. Method for fastening a component on a carrier part with a device according to claim 1, wherein:
a bushing is inserted into the opening of the component, wherein a pushing element is mounted on the bushing, and wherein the pushing element abuts on the component with an abutting surface,
the bushing is mounted on the fastening element, wherein the at least one locking element of the fastening element is pushed towards the inside of the opening of the component,
the pushing element is pushed over the bushing in the direction of the carrier part, wherein the component with the at least one opening is pushed past the at least one locking element of the fastening element,
the bushing is pulled off the fastening element, wherein the at least one locking element of the fastening element moves back to its idle position,
the pushing element is pulled off the component, so that the at least one locking element of the fastening element locks on the at least one opening of the component.

26. Method according to claim 25, wherein the bushing and the pushing element form an integrated part.

27. Method according to claim 25, wherein the pushing element comprises a cylindrical reception for receiving the bushing, wherein the diameter of the cylindrical reception is at least slightly larger than the outer diameter of the bushing.

28. Method according to claim 25, wherein the bushing is cylindrical, wherein the outer diameter of the bushing is at least slightly smaller than the diameter of the at least one opening of the component.

29. A device, comprising:
a carrier part; and
at least one fastener apparatus projecting from the carrier part,
wherein
the at least one fastener apparatus is welded to the carrier part,
the device is configured such that a component with at least one opening is fastenable onto the at least one fastener apparatus welded to the carrier part by mounting the component with the at least one opening onto the at least one fastener apparatus,
the at least one fastener apparatus comprises at least one elastic locking element, which locks on the at least one opening of the component and remains undeformed when the component is mounted on the at least one fastener apparatus,
the at least one fastener apparatus includes a monolithic component that includes the at least one elastic locking element, the monolithic component being directly welded to the carrier part, and
the at least one fastener apparatus is a one-piece stamped and bent part made of metal material.

30. The device of claim 29, wherein:
the at least one locking element comprises at least two resilient locking legs which project away from the carrier part through the at least one opening when the component is mounted on the at least one fastener apparatus.

31. The device of claim 29, wherein:
the fastener apparatus comprises at least two resilient locking legs which project away from the carrier part through the at least one opening when the component is mounted on the at least one fastener apparatus, wherein the legs further include locking elements that extend away from distal ends of the legs towards the carrier part.

32. Device according to claim 29, wherein:
the at least one fastening apparatus is configured such that the fastener apparatus moves together with the carrier part during fastening of the component to the carrier part in a direction of insertion of the fastening apparatus into the component.

33. Device according to claim 29, wherein
the at least one locking element comprises at least two resilient locking legs which project away from the carrier part, and
the locking legs each comprise at least one locking projection, wherein the locking projections each comprise a locking element having a locking surface facing towards the carrier part, wherein the locking projections extend outward away from the respective locking legs, and wherein the locking element extend inward towards the locking legs away from an end of the respective locking projections.

34. The device of claim 29, wherein:
the at least one locking element comprises at least two resilient locking legs which project away from the carrier part; and
the device is configured such that the locking legs resiliently deform inward to be at least substantially within the extrapolated circumference of a foot part of the locking element such that the maximum outer diameter of the device normal to a longitudinal axis of the device is contracted by about half, the extrapolated circumference being parallel to the longitudinal axis.

35. Device according to claim 29, wherein the at least one locking element comprises at least two resilient locking legs which project away from the carrier part, and the locking legs each comprise at least one locking projection, wherein the locking projections each comprise a locking element having a locking surface facing towards the carrier part, wherein the locking projections extend outward away from the respective locking legs, and wherein the locking element extend inward towards the locking legs away from an end of the respective locking projections, and wherein the device is configured such that when the component is fastened onto the at least one fastener apparatus, the height of the fastener apparatus remains the same as prior to fastening.

36. Device according to claim 29, wherein:

the at least one locking element is taller than it is wide in an undeformed state, and the locking element comprises at least two resilient locking legs each of which has a first portion that projects away from the carrier part, a second portion that extends from the first portion towards the carrier part outwardly away from a longitudinal axis of the fastening apparatus, and a third portion defining an end of the locking leg and extending from the second portion toward the longitudinal axis of the fastening apparatus.

37. Device according to claim 29, wherein:

the at least one locking element is taller than it is wider in a completely collapsed state, wherein the locking element comprises at least two resilient locking legs which have a first portion that projects away from the carrier part and a second portion that extends towards the carrier part outwardly away from a longitudinal axis of the fastening apparatus.

38. The device of claim 29, wherein:

the at least one locking element comprises at least two resilient locking legs which project away from the carrier part and are dimensionally stable during fastening to the component with at least one opening the at least one fastener apparatus further includes a foot part fixedly connected to the carrier part, and the device is configured such that the locking legs resiliently deform inward to be at least substantially within an extrapolated circumference of the foot part such that the maximum outer diameter of the device normal to a longitudinal axis of the device is contracted by about half, the extrapolated circumference being parallel to the longitudinal axis.

39. Device according to claim 29, wherein the at least one fastener apparatus has a foot part, and starting from the foot part, two elastic locking legs of the elastic locking element extend away from the carrier part, wherein a cross-section of the locking legs decreases from a locking surface forming an upper end of a locking projection of the locking legs towards a free end of the locking legs thereby forming an arrow shape.

40. Device according to claim 29, wherein the at least one fastener apparatus is about twice as tall as it is wide when the at least one elastic locking element is in an unrestrained state.

41. Device according to claim 29, wherein the at least one fastener apparatus is configured to resiliently deform inward such that a maximum outer diameter of a thickness of the at least one locking element is reduced by at least about half.

42. Device according to claim 29, wherein the at least one fastener apparatus is configured to resiliently deform inward such that a maximum outer diameter thereof is reduced by about one fifth of the height of the at least one fastening apparatus.

43. Device according to claim 29, further comprising the component with at least one opening, wherein the at least one fastener apparatus includes at least two resilient locking legs each of which includes a first portion projecting away from the carrier part, a second portion extending from the first portion towards the carrier part outwardly away from a longitudinal axis of the fastening apparatus, and then extending inwardly towards the longitudinal axis of the fastening apparatus, and wherein the fastener apparatus is configured such that no portion of the second portion is interposed between a first surface of the component with the least one opening and a second surface of the carrier part facing the first surface.

44. Device according to claim 29, further comprising the component with at least one opening, wherein the fastener apparatus is configured such that no portion of the fastener apparatus is interposed between a first surface of the component with the least one opening and a second surface of the carrier part facing the first surface.

45. Device according to claim 29, further comprising the component with at least one opening, wherein the fastener apparatus is configured such that during insertion into the opening during fastening, the greatest width of the fastener apparatus becomes less than the width of the opening.

46. Device according to claim 29, further comprising the component with at least one opening, wherein when the at least one elastic locking element locks on the at least one opening of the component, an end of the at least one elastic locking element is configured to be inward of and spaced away from a periphery of the at least one opening of the component in a direction perpendicular to a longitudinal axis of the fastener apparatus.

\* \* \* \* \*